S. P. BUSH.
CAR COUPLING.
APPLICATION FILED NOV. 25, 1912.
1,069,600.
Patented Aug. 5, 1913.
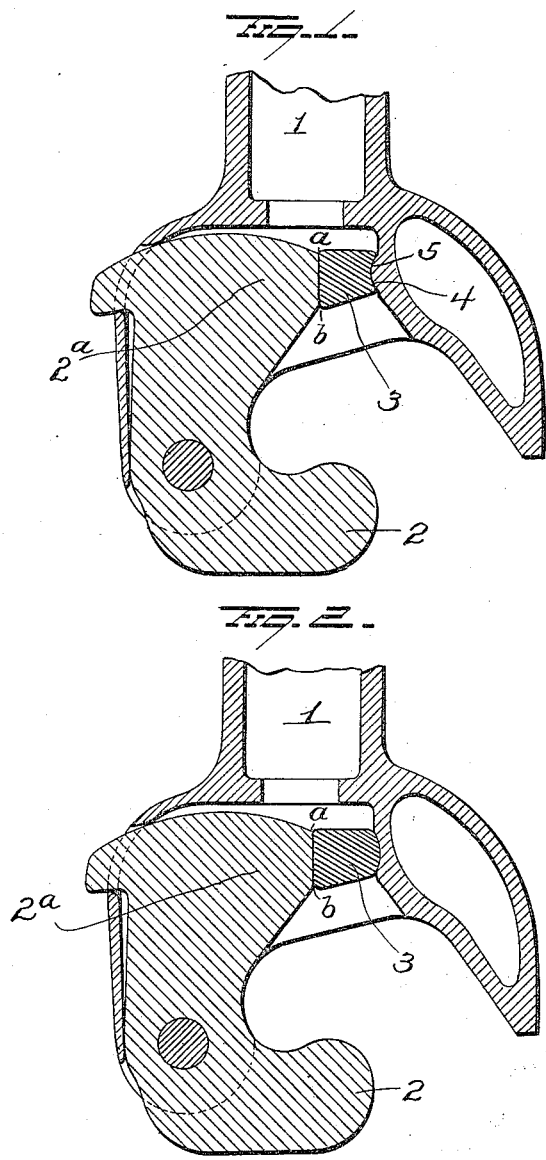

UNITED STATES PATENT OFFICE.

SAMUEL P. BUSH, OF COLUMBUS, OHIO, ASSIGNOR TO THE BUCKEYE STEEL CASTINGS COMPANY, OF COLUMBUS, OHIO.

CAR-COUPLING.

1,069,600.　　　　　Specification of Letters Patent.　　Patented Aug. 5, 1913.

Application filed November 25, 1912.　Serial No. 733,557.

*To all whom it may concern:*

Be it known that I, SAMUEL P. BUSH, of Columbus, in the county of Franklin and State of Ohio, have invented certain new and useful Improvements in Car-Couplings; and I do hereby declare the following to be a full, clear, and exact description of the invention, such as will enable others skilled in the art to which it appertains to make and use the same.

My invention relates to an improvement in car couplings, the object being to provide a coupling with a lock capable of a slight turning movement under the pressure of the knuckle, so that the lock may adjust itself to provide a complete and uniform bearing or contact between the contacting surfaces of the knuckle tail and the lock, and my invention consists in a coupling head and a locking pin or block therein, the said head and pin or block having correspondingly curved vertical bearing surfaces whereby the pin or block may turn on its curved bearing to adjust itself with relation to the tail of the knuckle.

In the accompanying drawings, Figure 1 is a view in longitudinal horizontal section through a coupling head knuckle and locking block or pin, and Fig. 2 is a similar view of a modified form.

1 represents a coupling head, 2 the knuckle pivoted to the head in the usual and well known manner and 3 is the locking pin or block which may be of any approved construction.

The locking pin or block 3 is supported at its outer side by the wall of the coupling head, and the tail 2ª of the knuckle 2 is provided with a straight surface between the points *a* and *b*, adapted to bear against the adjacent side of the pin or locking block 3. In ordinary practice, if the parts are not accurately constructed, one of the extremes *a* or *b*, of the bearing surface of the knuckle tail, will make contact with the locking pin or block before the other, and as there is no give to the parts, such point will have to sustain all the pressure, and thus cause rapid wear and exposure to fracture. My improvements consists in providing the surface of the wall of the coupling head against which the pin or locking block bears, with a vertical convex ridge 4, and providing the outer face of the pin or block with a vertical concavity conforming to the convex rib and adapted to receive the same, so as to permit the pin or block to turn on its convex bearing until the bearing surface of the knuckle tail has a complete and uniform bearing against the adjacent face of the pin or block. With this construction if one extreme of the bearing surface of the tail of the knuckle makes contact with the pin or locking block, the pressure of same against the pin or block will shift or turn the latter on its bearing until the two bearing surfaces are in complete and uniform contact.

Instead of providing the coupling head with a convex rib and the pin or block with a concavity, the pin or block may be convex and the coupling head provided with a concave seat as shown in Fig. 2.

It is evident that many slight changes might be resorted to in the relative arrangement of parts shown and described without departing from the spirit and scope of my invention. Hence I would have it understood that I do not wish to confine myself to the exact construction and arrangement of parts shown and described, but, Having fully described my invention what I claim as new and desire to secure by Letters-Patent, is:—

1. In a car coupling, the combination of a coupling head, a knuckle and a lock the latter having a curved bearing on its side that is approximately parallel with its side which engages the knuckle, the said curved bearing adapted to slide on a correspondingly curved surface on the head while it is being lifted and lowered, and on which it has pivotal movement when in locking position whereby it may adjust itself to the contacting surface of the knuckle.

2. In a car coupling, the combination of a coupling head having a curved, vertically arranged rib on the side wall of its throat, and a lock having a surface corresponding to the curved rib, the said curved surface being at the side of the lock farthest removed from the side which engages the knuckle of the coupling head, whereby the lock may be
5 moved vertically and have a pivotal movement on said rib when in locked position.

In testimony whereof, I have signed this specification in the presence of two subscribing witnesses.

SAMUEL P. BUSH.

Witnesses:
ARNO EBERLEIN,
W. E. PAGE.

Copies of this patent may be obtained for five cents each, by addressing the "Commissioner of Patents, Washington, D. C."